J. W. LEDOUX.
FLUID MEASURING MECHANISM.
APPLICATION FILED MAR. 18, 1915.

1,225,977.

Patented May 15, 1917.
3 SHEETS—SHEET 1.

Fig. 1ª

Witnesses:
Jos. G. Penny Jr.
Marjory D. Graf

Inventor:
John W. Ledoux,
By Chas. N. Butler
Attorney

J. W. LEDOUX.
FLUID MEASURING MECHANISM.
APPLICATION FILED MAR. 18, 1915.

1,225,977.

Patented May 15, 1917.
3 SHEETS—SHEET 2.

Fig. 3.ª

Witnesses:

Inventor:
John W. Ledoux,

By Chas. N. Butler
Attorney

J. W. LEDOUX.
FLUID MEASURING MECHANISM.
APPLICATION FILED MAR. 18, 1915.

1,225,977.

Patented May 15, 1917.
3 SHEETS—SHEET 3.

Inventor,
John W. Ledoux,
By Chas. N. Butler
Attorney

Witnesses:

UNITED STATES PATENT OFFICE.

JOHN W. LEDOUX, OF SWARTHMORE, PENNSYLVANIA.

FLUID-MEASURING MECHANISM.

1,225,977.  Specification of Letters Patent.  Patented May 15, 1917.

Application filed March 18, 1915. Serial No. 15,208.

*To all whom it may concern:*

Be it known that I, JOHN W. LEDOUX, a citizen of the United States, residing at Swarthmore, in the county of Delaware and State of Pennsylvania, have invented Improved Fluid-Measuring Mechanism, of which the following is a specification.

My improvements are designed for measuring the quantity of fluid flowing through a conduit, or conduits passing proportionate quantities, and in the form selected for their embodiment the mechanism is particularly adapted for measuring water discharged from a channel through a weir and simultaneously measuring a proportionate quantity of a coagulant to be delivered to the water.

Figure 1:
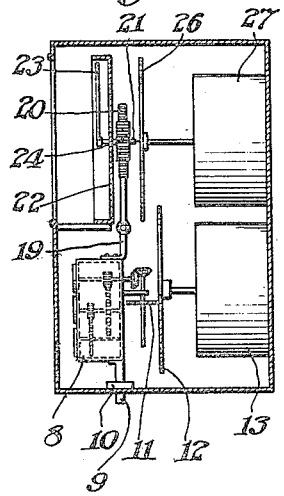
Figure 1:
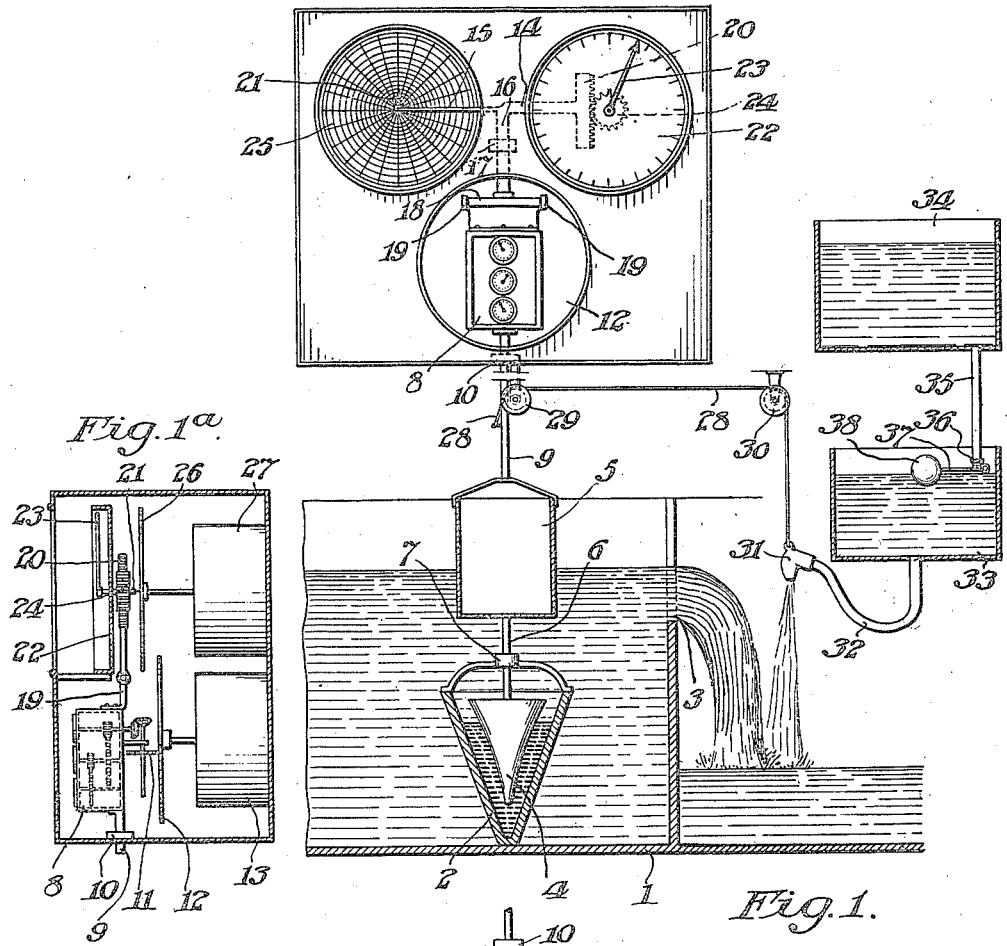
Figure 2:
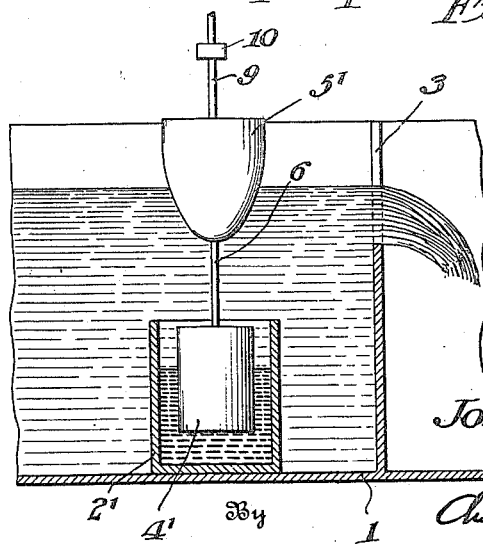
Figure 3:
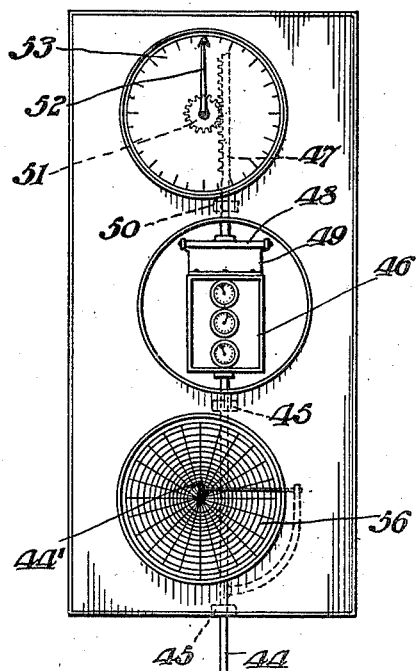
Figure 3:
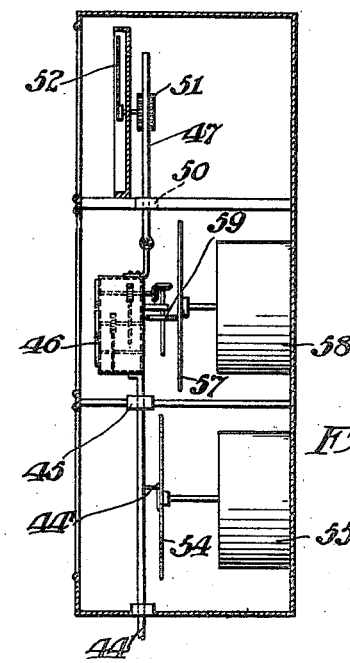
Figure 3:
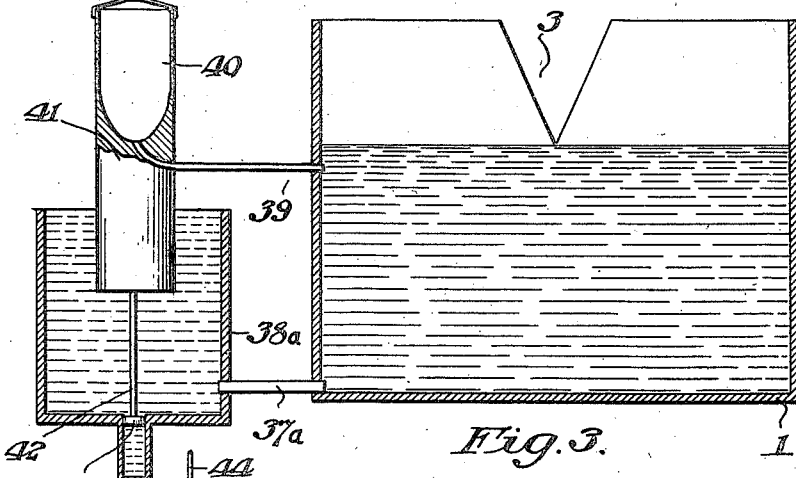
Figure 4:
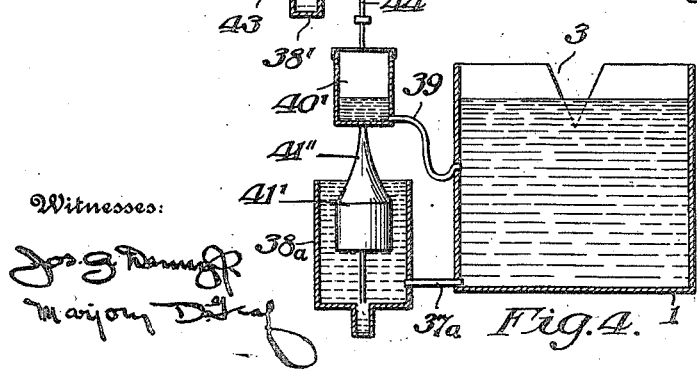
Figure 5:
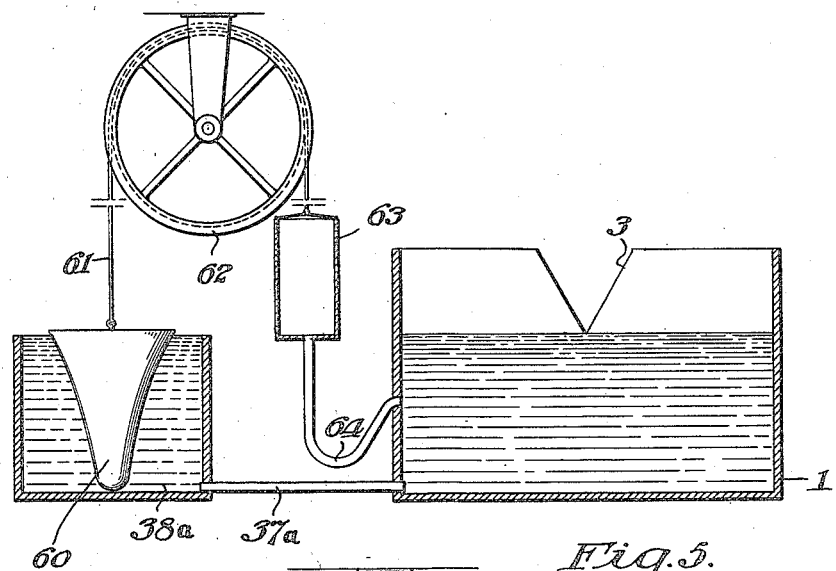
Figure 6:
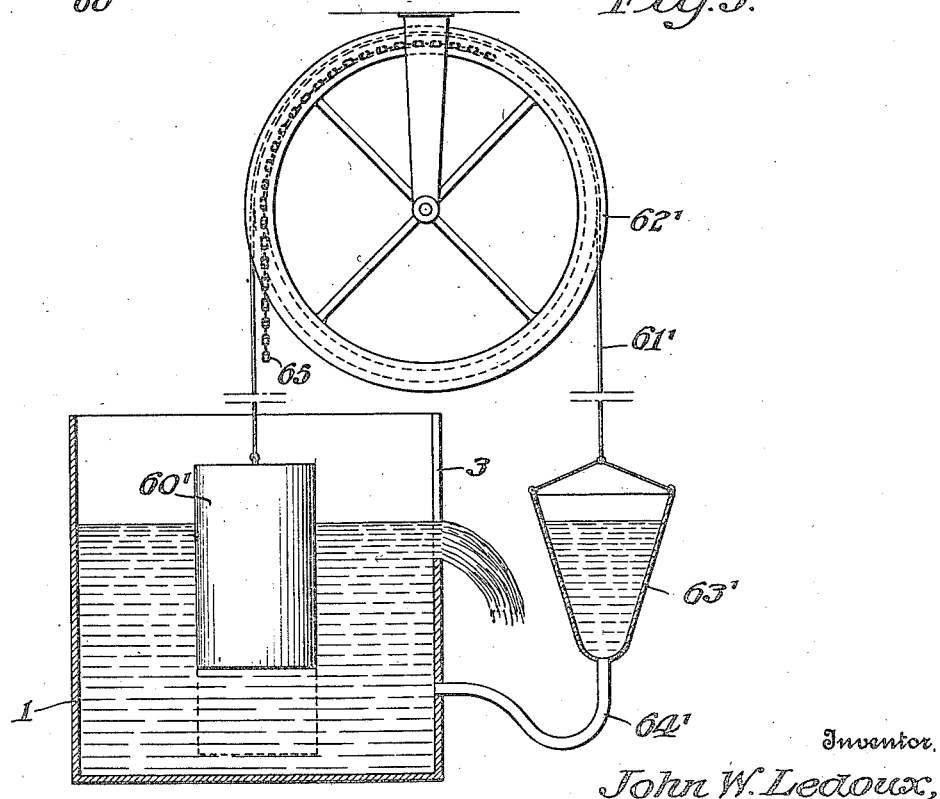

In the accompanying drawings, Figure 1 is a sectional elevation of mechanism embodying improvements of my invention; Fig. 1ª is a sectional side elevation of details shown in front elevation in Fig. 1; Fig. 2 is a sectional elevation illustrating a modification of details of the construction shown in Fig. 1; Fig. 3 is a sectional elevation representing a second modification of the construction shown in Fig. 1; Fig. 3ª is a sectional side elevation of the indicating mechanism shown in Fig. 3; Fig. 4 is a sectional elevation representing a modification of the float mechanism shown in Fig. 3; Fig. 5 is a sectional view of a modification embodying a specially shaped float combined with a counterbalancing vessel of regular cross section; and Fig. 6 is a sectional view of a modification embodying a specially shaped vessel in combination with a float of uniform cross section.

The invention, as illustrated by Figs. 1 and 1ª of the drawings, is embodied in a conduit 1 containing a vessel or chamber 2, the conduit discharging the water or other fluid which it carries through the weir or notch 3 and the chamber containing mercury or other liquid heavier than the fluid flowing in the conduit.

A float 4 variable in cross section, is disposed in the vessel 2 so that it can be reciprocated in the contained heavier liquid, and a float 5, of uniform cross section, is disposed in the conduit 1 so that it can be reciprocated in the contained liquid to be measured, the floats being connected by a rod 6 which reciprocates through a guide 7.
A register 8 is carried on a rod 9 which is connected with the float 5 and reciprocates in the guide 10. The register is operated by its driving wheel 11 which is movable radially on a friction disk 12 revolved at a constant rate by a clock 13, the register being moved to effect such radial movement by the reciprocations of the rod 9.

Arms 14 and 15 are connected by a coupling 16, which moves in a guide 17, with a cross piece 18 having its ends journaled in or flexibly connected to the register's frame members 19, the arm 14 being provided with a rack 20 and the arm 15 with a pencil or pen 21. An indicating dial 22 has coördinated therewith a hand 23 revolved by a pinion 24 which is engaged by the rack 20 and a chart 25 on a revoluble disk 26 is revolved by a clock 27 in contact with the marker 21.

A cord 28, having an end fixed to the shaft 9, passes over the sheaves 29 and 30 to a connection with a nozzle 31 of a flexible tube 32, the latter being connected with the bottom of a vessel 33, for holding a coagulating fluid.
A constant head is maintained in the vessel 33 by means of a storage vessel 34 discharging through the passage 35 and a valve 36 automatically operated by a lever 37 provided with a float 38, the latter being movable with changes in the level of the fluid in the vessel 33 in which it floats.

In operation, when the liquid in the conduit 1 is level with the bottom of the weir or notch 3, so that there is no flow, the floats 4 and 5 stand at the lower limits of their movements, while the wheel 11, the marker 21 and the hand 23 are held at their zero or datum positions by the actions of the floats through the connecting parts 6, 8, 9, 14, 15, 16, 18, 19, 20, and 24, and the nozzle 31 is elevated by the cord 28 so that no coagulant is discharged.

As the level of the liquid in the conduit varies and the volume flowing over the weir changes, the floats 4 and 5 move correspondingly so that their elevation above their datum lines is always a function of the volume flowing, the action of the water or other liquid upon the float 5 being modified by the weight of the float 4 which displaces as it rises a decreasing volume of mercury at such rate that the vertical movement is regulated in the desired manner.

As the floats 4 and 5 rise, the nozzle 31 is lowered from its highest position (with no discharge therefrom when there is no flow through the weir) to its lowest position with the maximum flow therethrough when there is a maximum flow through the weir, the discharge through the nozzle being proportionate to the discharge through the weir at all times.

As the floats 4 and 5 rise and fall, the wheel 11 is moved radially from and toward the center of the constantly revolving disk 12 by which it is operated and the rate of the registration is changed proportionately to the changes in the flow, so that the register will show the total quantity which has been discharged over the weir.

The arms 14 and 15, which rise and fall with the floats, operate the respective devices 23 and 21, the former indicating upon the dial 22 the rate of flow at a given instant and the latter recording upon the chart 25 the rates throughout an extended period of time.

As illustrated in Fig. 2, the mechanism may be varied by the use of a float 4', of constant cross-section movable in a liquid heavier than water, as mercury, contained in a chamber or vessel 2', and a float 5', of variable cross section, joined with the float 4' by a connection 6, the float 5' being shaped so that the movement (caused by the rise or fall of the liquid in the conduit 1 and modified by the action of the float 4') will effect the previously described movement of the rod 9.

As illustrated in Figs. 3 and 3ª, the channel 1, which discharges through the weir 3, is connected below the weir, by a conduit 37ª, with a constantly filled chamber 38ª, and, by a flexible tube 39, with a chamber 40, of variable cross section, in the top of the displacing device or float 41, of uniform cross section. The chamber 40 and float 41 stand at their maximum elevation, with the bottom of the chamber level with the crest or bottom of the weir, when the liquid level in the conduit 1 is at the crest of the weir. As the liquid in the channel 1 rises, it is delivered through the conduit 39 to the chamber 40, whereby the float 41 is caused to sink, the cross sections of the chamber 40 increasing at such ratio that the differential between the weight of the liquid in such chamber and the buoyancy of the float will vary with the discharge through the weir.

A rod 42 is connected with the bottom of the float 41 and provided with a spider 43, which moves in a way 38' in the bottom of the chamber 38 to provide a guide. A rod 44, guided by the bearings 45, connects the top of the float with a register 46, the rod having a marker 44' thereon. A rack 47, having the cross head 48 flexibly connected with the register's frame member 49, reciprocates in the bearing 50 and operates a pinion 51, the latter having fixed thereto a pointer 52 which is movable over a dial 53.

A disk 54, revolved by a clock 55, carries a chart 56 with which the member 44' makes contact. A disk 57 revolved by a clock 58 drives a wheel 59 for operating the register 46.

The bottom of the weir 3 and the bottom of the chamber 40 being at the same level when the liquid in the channel 1 is at the level of the bottom of the weir 3, the marker 44' is now in its position closest to the center of the chart 56, the wheel 59 is at the center of the disk 57 and the pointer 52 is at the zero point of the dial. As the liquid rises and falls in the channel 1, the float 41 falls and rises, so that the marker will move toward and from the center of the revolving chart 56 to record the flow throughout an extended period; the wheel 59 will move toward and from the center of the disk 57 to effect a variable operation of the register by which the total flow is indicated, and the pointer 52 is oscillated to indicate the rate of flow.

As shown in Fig. 4, the construction may be modified by using, in the chamber 38ª connected with the channel 1 by the duct 37ª, a float comprising a constantly submerged section 41' of uniform cross section and a variably submerged upper section 41" of variable cross section, in combination with a chamber 40', of uniform cross section, connected with the channel 1 by the flexible tube 39 and having the rod 44 connected therewith. In this construction, the bottom of the section 41" is at the level of the liquid in the chamber 38ª when the liquid in the channel 1 is at the level of the crest of the weir 3. As the liquid rises in the channel 1, it flows through the pipe 39 into the chamber 40', which sinks, submerging to a greater or less degree the section 41", which is shaped so that the resultant between the downward pressures variable with the weight of water in the chamber 40' and the buoyancies due to the variable displacement by the float is proportional to the flow through the weir 3.

As illustrated in Fig. 5, the chamber 38ª, connected with the channel 1 by the duct 37ª, contains the float 60, of variable cross section, which is connected by a cord or other tension member 61, passing over a sheave 62, with a chamber or vessel 63 of uniform cross section, the latter having its bottom connected by a flexible tube 64 with the channel 1 below the notch 3.

When the liquid in the channel 1 stands at the level of the bottom of the notch 3, the float 60 is at its greatest submergence, and the vessel 63 at its greatest elevation. As the liquid rises in the channel 1 and flows into the chamber 63, the latter sinks and the float 60 rises, the shape of the latter being such that its movement is proportionate to changes in the rate of flow and its elevation at any time a function thereof.

As illustrated in Fig. 6, the channel 1 contains a float 60' of uniform cross section, and a vessel 63' of variable cross section has its bottom connected by the flexible tube 64' with the channel below the notch 3, the float and vessel being connected by a cord or tension member 61' which passes over the sheave 62' and the sheave carrying a chain 65 for effecting a desired increasing counterbalance for the vessel 63' as the cylindrical float 60' descends.

When the liquid in the channel 1 stands at the level of the bottom of the notch 3, so that there is no flow, the float 60' is at its greatest submergence and the vessel 63 at its greatest elevation. As the liquid rises in the conduit, it flows into the vessel, which sinks, elevates the float and winds the chain on the wheel, the resultant of the forces varying so that the movement is proportional to changes in the flow through the weir and the elevations of the float and vessel are functions of such flow.

Having described my invention, I claim:

1. The combination with a conduit having a weir for the passage of fluid, of counter-balancing devices movable by resultant fluid pressures due to variations of the depth of fluid in said weir and adapted to be subjected respectively to different pressures in their different positions due to said variations.

2. The combination with a conduit having a weir for the passage of fluid, of counter-balancing devices comprising a float having variable submergence and exerting variable force due to variations of the level of said fluid, whereby the positions of said devices are functions of the depth of fluid in said weir.

3. The combination with a conduit having a weir for the passage of a fluid, of counter-balancing devices acting in different mediums and adapted to be subjected to different pressures respectively at different levels of the fluid in said weir, one of said devices displacing a different bulk of a medium aforesaid at different elevations of levels of said fluid, whereby the positions of said devices are functions of the depth of fluid in said weir.

4. The combination with a conduit having a weir for the passage of a fluid, of counter-balancing devices comprising connected floats acting in mediums of different specific gravity, one of said floats having variable cross-sections and different parts thereof submerged at different depths of fluid in said weir.

5. The combination with a conduit for conveying a fluid, of counter-balancing devices movable by resultant fluid pressures due to changes in the flow in said conduit, one of said devices having variable cross-sections and exerting variable pressures at different elevations thereof, whereby the movements of said devices are proportional to changes in the rate of flow in said conduit, a second conduit for conveying a fluid, and means operated by said devices for regulating the flow in said conduit second named proportionately to the flow in said conduit first named.

6. The combination with a conduit, of counter-balancing devices movable by resultant fluid pressures varying with variations in the flow of fluid in said conduit, one of said devices having variable cross-sections and exerting different pressures at different elevations, whereby the movements of said devices are functions of the flow in said conduit, and means comprising a tube having an outlet variable in elevation by said devices for regulating the flow of a substance in proportion to said fluid.

7. The combination with a conduit for conveying fluid, of counter-balancing devices acting in fluids of different densities and each submerged to different extents in the corresponding fluid by resultant fluid pressures due to changes in the flow in said conduit, one of said devices having variable cross sections and exerting variable pressures at different elevations thereof whereby the movements of said devices are proportional to changes in the rate of flow in said conduit.

8. The combination with a conduit for conveying a fluid, of counter-balancing floats rigidly fixed together, acting in different fluid mediums, and movable by resultant fluid pressures due to changes in the flow in said conduit; one of said devices having variable cross sections and exerting variable pressures at different elevations thereof whereby the movements of said devices are proportional to the rate of flow in said conduit.

In testimony whereof I have hereunto set my name this 16th day of March, 1915, in the presence of the subscribing witnesses.

JOHN W. LEDOUX.

Witnesses:
   Jos. G. Denny, Jr.,
   C. N. Butler.